US011105402B2

(12) United States Patent
Woo et al.

(10) Patent No.: US 11,105,402 B2
(45) Date of Patent: Aug. 31, 2021

(54) TENSIONER FOR HYBRID ELECTRIC VEHICLE

(71) Applicants: HYUNDAI MOTOR COMPANY, Seoul (KR); KIA MOTORS CORPORATION, Seoul (KR); GATES UNITTA KOREA CO., LTD, Seoul (KR)

(72) Inventors: Sangkyu Woo, Yongin-si (KR); Ji-Sik Jang, Gwangmyeong-si (KR); Jae-Hyuk Jung, Daegu (KR)

(73) Assignees: HYUNDAI MOTOR COMPANY, Seoul (KR); KIA MOTORS CORPORATION, Seoul (KR); GATES UNITTA KOREA CO., LTD., Seoul (KR)

( * ) Notice: Subject to any disclaimer, the term of this patent is extended or adjusted under 35 U.S.C. 154(b) by 335 days.

(21) Appl. No.: 16/414,561

(22) Filed: May 16, 2019

(65) Prior Publication Data
US 2020/0124144 A1   Apr. 23, 2020

(30) Foreign Application Priority Data

Oct. 19, 2018   (KR) .................. 10-2018-0125152

(51) Int. Cl.
*F16H 7/12*     (2006.01)
*H02K 7/10*     (2006.01)
(Continued)

(52) U.S. Cl.
CPC .......... *F16H 7/1281* (2013.01); *H02K 7/1008* (2013.01); *F16H 2007/081* (2013.01);
(Continued)

(58) Field of Classification Search
CPC ....... F16H 2007/0874; F16H 2007/081; F16H 2007/0806; F16H 7/1281; F02B 67/06
(Continued)

(56) References Cited

U.S. PATENT DOCUMENTS 6,511,393 B1 *  1/2003  Bogl ..................... F01L 1/024
                                                            474/101
6,609,989 B2 *  8/2003  Bogner ................. F02B 63/04
                                                            474/134
(Continued)

FOREIGN PATENT DOCUMENTS

KR          10-1241209 B1      3/2013

*Primary Examiner* — Henry Y Liu
(74) *Attorney, Agent, or Firm* — Morgan, Lewis & Bockius LLP

(57) ABSTRACT

A tensioner for a hybrid electric vehicle adjusts tension of the belt which is provided to synchronize rotation of a pulley of a starting motor shaft and rotation of a pulley of a crankshaft. The tensioner for a hybrid electric vehicle may include: a base arm, a driving arm pivotably connected with the base arm, and a driven arm pivotably connected with the base arm. The tensioner further includes an actuator operating so as to autonomously vary an entire length so that one end thereof is fixed to the base arm and the other end thereof is connected with the driving arm; a first pulley rotatably connected with the first pulley connecting portion or the driving arm and rolling while contacting the belt; and a second pulley rotatably connected with the second pulley connecting portion of the driven arm and rolling while contacting the belt.

11 Claims, 5 Drawing Sheets

(51) Int. Cl.
*F16H 7/08* (2006.01)
*H02J 7/14* (2006.01)
(52) U.S. Cl.
CPC .............. *F16H 2007/0846* (2013.01); *F16H 2007/0874* (2013.01); *H02J 7/1446* (2013.01)
(58) Field of Classification Search
USPC ........................................................ 474/134
See application file for complete search history.

(56) References Cited

U.S. PATENT DOCUMENTS

| | | | | |
|---|---|---|---|---|
| 6,648,783 B1* | 11/2003 | Bogner | ................ | F16H 7/1281 474/134 |
| 6,689,001 B2* | 2/2004 | Oliver | .................. | F16H 7/1281 474/134 |
| 6,857,978 B2* | 2/2005 | Polster | ................. | F16H 7/1209 474/134 |
| 6,942,589 B2* | 9/2005 | Rogers | ..................... | F16H 7/12 474/134 |
| 6,960,145 B2* | 11/2005 | Fraley, Jr. | ............ | B62D 5/0424 180/444 |
| 7,124,733 B2* | 10/2006 | Kusumi | .................. | F02B 67/06 123/198 R |
| 7,419,447 B2* | 9/2008 | Serkh | .................... | F16H 7/1218 474/117 |
| 7,468,013 B2* | 12/2008 | Di Giacomo | ......... | F16H 7/1281 474/134 |
| 7,494,434 B2* | 2/2009 | McVicar | .............. | F16H 7/1281 474/101 |
| 8,092,328 B2* | 1/2012 | Dec | ........................ | F02B 67/06 474/135 |
| 8,353,795 B2* | 1/2013 | Montani | .............. | F16H 7/1281 474/134 |
| 8,439,780 B2* | 5/2013 | Ruffini | ................. | F16H 7/1281 474/112 |
| 8,821,328 B2* | 9/2014 | Jud | ....................... | F16H 7/1281 474/134 |
| 9,182,015 B2* | 11/2015 | Mack | ...................... | F02B 67/06 |
| 9,341,243 B2* | 5/2016 | Replete | ................ | F16H 7/1218 |
| 9,625,013 B2* | 4/2017 | Wolf | .................... | F16H 7/1281 |
| 9,651,122 B2* | 5/2017 | Harvey | .................. | F16H 7/129 |
| 9,709,137 B2* | 7/2017 | Walter | .................. | F16H 7/0831 |
| 9,759,293 B2* | 9/2017 | Ryeland | ............... | F16H 7/1281 |
| 9,890,837 B1* | 2/2018 | Martinez | ................... | F16H 7/12 |
| 10,024,403 B2* | 7/2018 | Kim | ........................ | F02N 19/00 |
| 10,393,238 B2* | 8/2019 | Robertson | ................ | F16H 7/12 |
| 10,626,960 B2* | 4/2020 | Kwon | ..................... | F02B 67/06 |
| 10,907,602 B1* | 2/2021 | Basile | .................. | F02N 11/003 |
| 2002/0039942 A1* | 4/2002 | Liu | ....................... | F16H 7/1209 474/133 |
| 2002/0039944 A1* | 4/2002 | Ali | ....................... | F16H 7/1218 474/135 |
| 2002/0086751 A1* | 7/2002 | Bogner | .................. | F02B 67/06 474/134 |
| 2002/0183149 A1* | 12/2002 | Temma | ..................... | F16H 9/20 474/133 |
| 2003/0171179 A1* | 9/2003 | Okuda | .................. | F16H 7/129 474/110 |
| 2003/0176249 A1* | 9/2003 | Polster | ................. | F16H 7/1209 474/134 |
| 2004/0227400 A1* | 11/2004 | Kraus | .................. | F16H 7/1209 305/143 |
| 2005/0187052 A1* | 8/2005 | Yokoyama | ........... | F16H 7/1281 474/117 |
| 2005/0192142 A1* | 9/2005 | Stone | ................. | F01L 1/024 474/101 |
| 2005/0192144 A1* | 9/2005 | Yokoyama | ........... | F16H 7/1281 474/117 |
| 2005/0282669 A1* | 12/2005 | Bauer | .................. | F16H 7/1281 474/117 |
| 2006/0217222 A1* | 9/2006 | Lolli | ...................... | F02B 67/06 474/134 |
| 2006/0240922 A1* | 10/2006 | Pendergrass | .......... | F16H 7/1281 474/102 |
| 2006/0287146 A1* | 12/2006 | McVicar | ............... | F16H 7/1281 474/109 |
| 2007/0037648 A1* | 2/2007 | Di Giacomo | .......... | F02B 67/06 474/134 |
| 2008/0070731 A1* | 3/2008 | Vrsek | ..................... | F01L 1/348 474/134 |
| 2009/0239693 A1* | 9/2009 | Ruffini | .................. | F16H 7/1281 474/112 |
| 2010/0331127 A1* | 12/2010 | Dec | ....................... | F16H 7/1218 474/135 |
| 2011/0070984 A1* | 3/2011 | Kotzur | .................... | F02B 67/06 474/133 |
| 2011/0070985 A1* | 3/2011 | Deneszczuk | .............. | F16H 7/14 474/135 |
| 2011/0073692 A1* | 3/2011 | Bouwers | ............... | F16H 7/0827 241/101.2 |
| 2013/0040770 A1* | 2/2013 | Wolf | ..................... | F16H 7/1281 474/134 |
| 2013/0095967 A1* | 4/2013 | Wolf | ..................... | F16H 7/1281 474/135 |
| 2013/0172137 A1* | 7/2013 | Antchak | .................. | F16H 7/12 474/133 |
| 2013/0260932 A1* | 10/2013 | Adam | ..................... | F16H 7/1218 474/134 |
| 2014/0031157 A1* | 1/2014 | Takano | ................ | F16C 35/063 474/135 |
| 2014/0194236 A1* | 7/2014 | Orita | ..................... | F16H 7/1281 474/112 |
| 2014/0315673 A1* | 10/2014 | Zacker | .................. | F16H 7/1218 474/135 |
| 2015/0051033 A1* | 2/2015 | Replete | ................. | F16H 7/1209 474/117 |
| 2015/0057117 A1* | 2/2015 | Antchak | ................ | F16H 7/1281 474/109 |
| 2015/0126315 A1* | 5/2015 | Farewell | ............... | F16H 7/1281 474/109 |
| 2015/0247559 A1* | 9/2015 | Graves | ................. | F16H 7/1218 474/117 |
| 2015/0308545 A1* | 10/2015 | Harvey | ................... | F02B 67/06 474/117 |
| 2016/0146312 A1* | 5/2016 | Pfeifer | ..................... | F16H 7/08 474/135 |
| 2016/0160830 A1* | 6/2016 | Noguchi | ................. | F02B 67/06 123/179.25 |
| 2016/0215860 A1* | 7/2016 | Thompson | ........... | F16H 7/1281 |
| 2016/0230853 A1* | 8/2016 | Harvey | ................. | F16H 7/129 |
| 2016/0363046 A1* | 12/2016 | Pendovski | ................ | F16H 7/08 |
| 2017/0138445 A1* | 5/2017 | Farewell | ................. | F02B 67/06 |
| 2017/0146100 A1* | 5/2017 | Walter | .................... | F02B 67/06 |
| 2018/0017143 A1* | 1/2018 | Antchak | ................. | B60K 25/02 |
| 2018/0058551 A1* | 3/2018 | Takahashi | ................ | F16H 7/12 |
| 2018/0066733 A1* | 3/2018 | Robertson | ................ | F16H 7/12 |
| 2018/0202521 A1* | 7/2018 | Reuschel | ............... | F16H 7/1218 |
| 2018/0355955 A1* | 12/2018 | Lee | ......................... | F02B 67/06 |
| 2018/0363743 A1* | 12/2018 | Chang | ................... | F16H 7/1281 |
| 2019/0017579 A1* | 1/2019 | Stadermann | .......... | F16H 7/1218 |
| 2019/0040937 A1* | 2/2019 | Van Ruiten | ............. | C08K 7/14 |
| 2020/0072323 A1* | 3/2020 | Montani | ................. | F16H 7/08 |
| 2020/0088273 A1* | 3/2020 | Yoon | ..................... | F02B 67/06 |
| 2021/0018074 A1* | 1/2021 | Pfeifer | ..................... | F16H 7/10 |

\* cited by examiner

TENSIONER FOR HYBRID ELECTRIC VEHICLE

CROSS-REFERENCE TO RELATED APPLICATION

This application claims priority to and the benefit of Korean Patent Application No. 10-2018-0125152 filed in the Korean Intellectual Property Office on Oct. 19, 2018, the entire contents of which are incorporated herein by reference.

BACKGROUND

(a) Field

The present disclosure relates to a tensioner for a hybrid electric vehicle, and more particularly, to a tensioner for a hybrid electric vehicle capable of being provided to a mild hybrid electric vehicle.

(b) Description of the Related Art

Generally, a hybrid electric vehicle uses an internal combustion engine and a battery power source together. That is, the hybrid electric vehicle efficiently combines and uses torque of the internal combustion engine and torque of the motor.

The hybrid electric vehicle may be divided into a mild type and a hard type according to a division ratio of power of an engine and power of the motor. The mild type hybrid electric vehicle includes a mild hybrid starter & generator (MHSG) for starting an engine instead of an alternator or generating electricity by an output of the engine. The hard type hybrid electric vehicle separately includes an integrated starter-generator for starting an engine or generating electricity by an output of the engine and a drive motor for driving the vehicle. In addition, the mild type hybrid electric vehicle may assist an engine torque according to a running state using the MHSG, and may charge a battery through the regenerative braking. Accordingly, energy efficiency a mild hybrid electric vehicle may be improved.

The above information disclosed in this Background section is only for enhancement of understanding of the background of the invention and therefore it may contain information that does not form the prior art that is already known in this country to a person of ordinary skill in the art.

SUMMARY

One aspect of the present invention provides a tensioner for a hybrid electric vehicle having advantages of improving spatial utility, maintaining traditional performance or improving performance, and being easily mounted.

A tensioner for a hybrid electric vehicle according to an embodiment of the present invention may be a tensioner for a hybrid electric vehicle to adjust tension of the belt which is provided to synchronize rotation of a pulley of a starting motor shaft and rotation of a pulley of a crankshaft.

The tensioner for a hybrid electric vehicle may include: a base arm fixed to a housing of a starting motor so that an actuator mounting portion is formed at one end thereof and a pivot shaft is rotatably connected with the other end thereof; a driving arm rotatably connected with the base arm by the pivot shaft so as to make a hinge motion around the pivot shaft so that an actuator connecting portion is formed at one end thereof which is extended to one side with respect to the pivot shaft and a first pulley connecting portion is formed at the other end thereof which is extended to the other side with respect to the pivot shaft; a driven arm configured so that one end thereof is rotatably connected with the base arm and the driving arm by the pivot shaft so as to make a hinge motion around the pivot shaft and a second pulley connecting portion is formed at the other end thereof which is extended from the one end thereof; an actuator operating so as to autonomously vary an entire length so that one end thereof is fixed to the actuator mounting portion and the other end thereof is connected with the actuator connecting portion; a first pulley rotatably connected with the first pulley connecting portion and configured to roll while contacting the belt; and a second pulley rotatably connected with the second pulley connecting portion and configured to roll while contacting the belt.

A distance between the actuator mounting portion and the actuator connecting portion may be varied depending on an operation of the actuator, thereby making a hinge motion of the driving arm around the pivot shaft, and the driven arm may make a hinge motion together with the driving arm.

A bushing may be interposed between the driving arm and the pivot shaft.

A bushing may be interposed between the driven arm and the pivot shaft.

The driven arm may be extended from the one end thereof to the other end thereof so as to surround an external circumference of the starting motor shaft pulley.

The starting motor shaft pulley may be disposed so as to be surrounded by the base arm, the driving arm, and the driven arm, and a part of the base arm and a part of the driven arm facing to the starting motor shaft pulley may be formed in an arc shape.

The actuator may be operated depending on all of a mechanical type and a hydraulic type.

The starting motor shaft pulley and the crankshaft pulley may be rolling while contacting an interior surface of the belt and the first pulley and the second pulley may be rolling while contacting an exterior surface of the belt such that the belt surrounds the starting motor shaft pulley and the crankshaft pulley.

The tensioner for a hybrid electric vehicle may further include a spring providing elastic force such that the second pulley maintains tension of the belt by elastically connecting the driven arm with the pivot shaft.

The driven arm may be relatively rotated with the driving arm as being permitted by the spring.

The first pulley and the second pulley may be disposed such that tension of the belt is to be smallest in a state of not operating the actuator when mounting the belt.

When an engine is started by rotation of the starting motor shaft pulley, the actuator may be operated such that a distance between the actuator mounting portion and the actuator connecting portion is to be short, thereby moving the first pulley and the second pulley toward one direction such that a portion of the belt which is contacted to the first pulley is to be similar to a straight line shape.

When electric power is generated by the starting motor shaft pulley, the actuator may be operated such that a distance between the actuator mounting portion and the actuator connecting portion is to be long, thereby moving the first pulley and the second pulley toward the other direction such that a portion of the belt which is contacted to the second pulley is to be similar to a straight line shape.

<Description of symbols>

| | |
|---|---|
| 1: tensioner | |
| 3: bolt | 5: bush |
| 7: spring | |
| 10: base arm | 12: actuator mounting portion |
| 14: pivot shaft connecting portion | |
| 15: bolting hole | |
| 18: pivot shaft | |
| 20: driving arm | 22: driving hinge portion |
| 24: actuator connecting portion | |
| 26: first pulley connecting portion | |
| 30: driven arm | 32: driven hinge portion |
| 34: second pulley connecting portion | |
| 40: actuator | |
| 51: first pulley | 52: second pulley |
| 60: belt | |
| 71, 73: washer | 72, 74: rubber ring |
| 75: dust cover | |
| 100: starting motor shaft pulley | |
| 200: crankshaft pulley | |
| 300: idler | |

DETAILED DESCRIPTION OF EMBODIMENTS

An embodiment of the present invention will hereinafter be described in detail with reference to the accompanying drawings.

In mild hybrid vehicles, the MHSG is to be synchronized with a crankshaft by using a belt. A tensioner is provided for adjusting tension of the belt. Meanwhile, a hydraulic type tensioner condignly maintaining tension by hydraulic operation or a mechanical type tensioner condignly maintaining tension by mechanical operation may be applied.

However, it is not easy that hydraulic pressure for condignly maintaining tension of the belt is autonomously adjusted in an ordinary hydraulic type tensioner. Further, in case of excessively supplying hydraulic pressure for maintaining tension, load that the belt receives and frictional force of the belt may be increased and fuel consumption of an engine may be deteriorated. Meanwhile, a tensioner to which a hydraulic type and a mechanical type are applied together so as to have all of merits of a hydraulic type and a mechanical type may deteriorate spatial utility, and it may be not easy to mount it.

Figure 1:
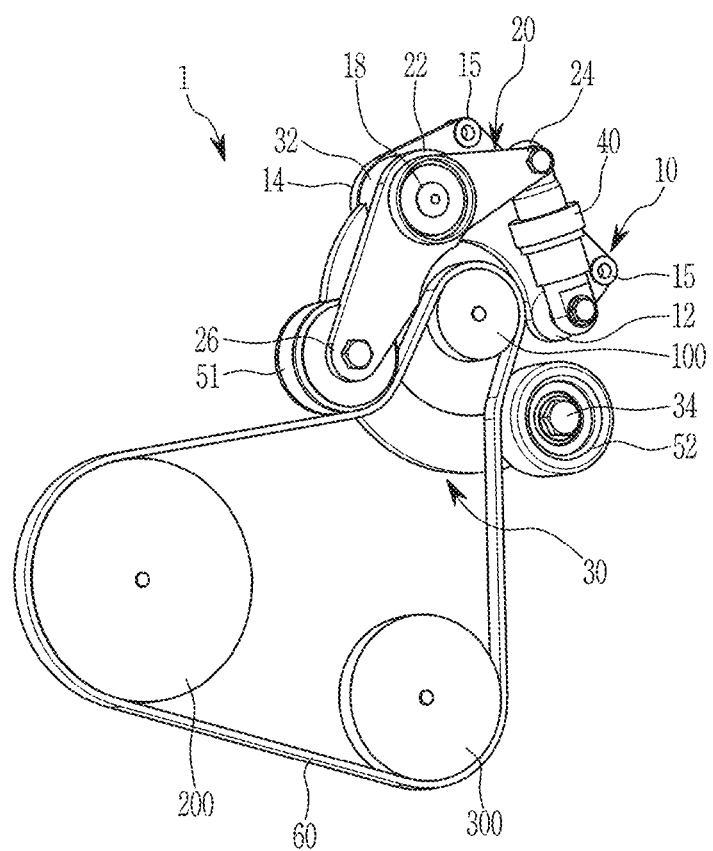
FIG. 1 is a perspective view of a tensioner for a hybrid electric vehicle according to an embodiment of the present invention.
Figure 2:
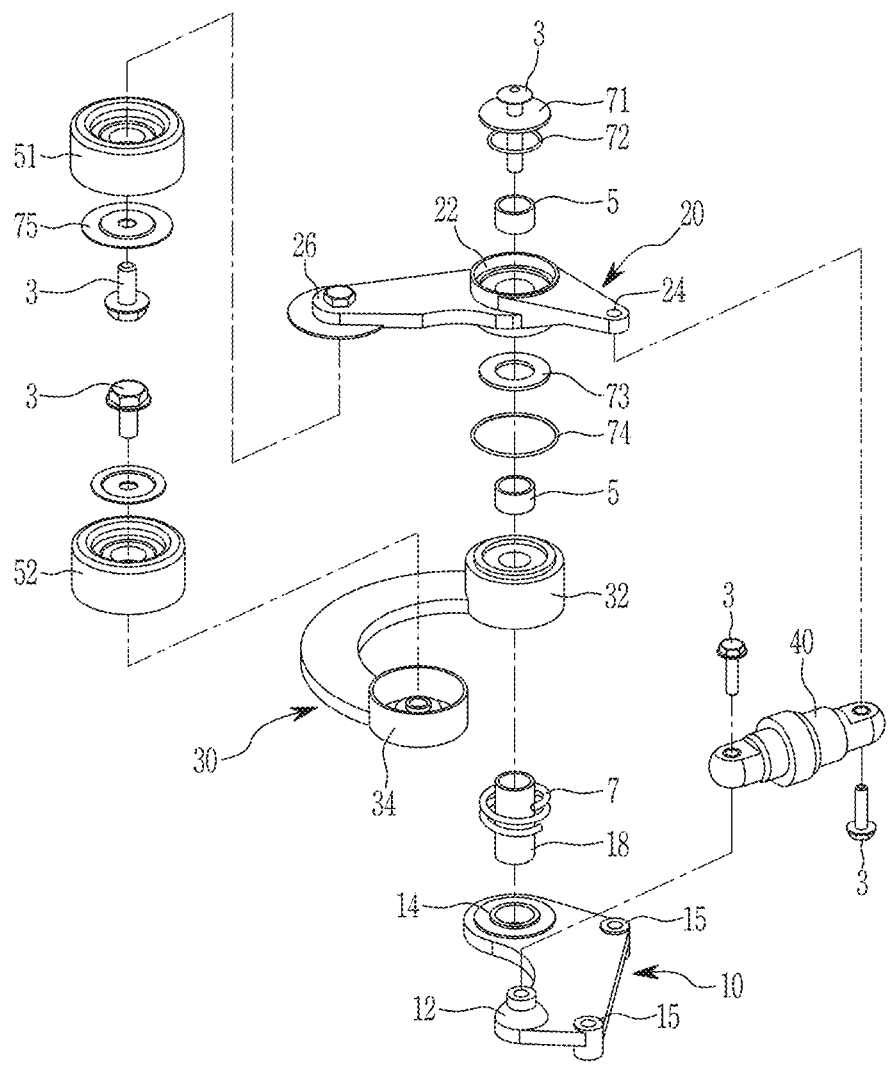
FIG. 2 is an exploded view of a tensioner for a hybrid electric vehicle according to an embodiment of the present invention.

FIG. 1 is a perspective view of a tensioner for a hybrid electric vehicle according to an embodiment of the present invention, and FIG. 2 is an exploded view of a tensioner for a hybrid electric vehicle according to an embodiment of the present invention.

As shown in FIG. 1 and FIG. 2, a tensioner 1 for a hybrid electric vehicle according to an embodiment of the present invention is provided for adjusting tension of a belt 60, which functions to realize synchronization between rotation of a pulley 100 (starting motor shaft pulley) of a starting motor shaft and rotation of a pulley 200 (crankshaft pulley) of a crankshaft, together with an idler 300. Meanwhile, the starting motor shaft pulley 100 is a pulley which rotates together with a drive shaft of a starting motor, the crankshaft pulley 200 is a pulley which rotates together with a crankshaft, and the starting motor may be a mild hybrid starter & generator (MHSG) which starts an engine or generates electric power by output of an engine in a mild hybrid electric vehicle. Herein, the function of the pulley such as the idler 300 which moves a rotation center thereof so as to push the belt 60 toward one direction is well known to a person of an ordinary skill in the art, so a detailed description thereof will be omitted.

The tensioner 1 for a hybrid electric vehicle according to an embodiment of the present invention includes a base arm 10, a driving arm 20, a driven arm 30, an actuator 40, a first pulley 51, and a second pulley 52.

The base arm 10 is fixed to a housing of the starting motor by being directly mounted to the housing. In addition, at least one bolting hole 15 is formed at the base arm 10 such that the base arm 10 can be bolted to the housing of the starting motor. Further, an actuator mounting portion 12 is formed at one end of the base arm 10, and a pivot shaft connecting portion 14 is formed at the other end of the base arm 10. Meanwhile, a pivot shaft 18 is connected with the pivot shaft connecting portion 14 as being rotatably inserted into the pivot shaft connecting portion 14. Herein, the pivot shaft 18 is formed in a hollow cylindrical shape, and may be bolted to the housing of the starting motor by a bolt 3. In embodiments, the pivot shaft 18 is fixed to the housing of the starting motor.

The driving arm 20 is rotatably connected with the pivot shaft connecting portion 14 of the base arm 10 by the pivot shaft 18. In addition, a driving hinge portion 22 is formed at the driving arm 20, and the driving arm 20 makes a hinge motion around the pivot shaft 18 as the driving hinge portion 22 is rotatably connected with the pivot shaft 18. In this regard, a bushing 5 may be interposed between the driving hinge portion 22 and the pivot shaft 18 in a portion of connecting the driving arm 20 with the pivot shaft 18. Further, an actuator connecting portion 24 is formed at one end of the driving arm 20 which extends to one side with respect to the driving hinge portion 22, and a first pulley connecting portion 26 is formed at the other end of the driving arm 20 which extends to the other side with respect to the driving hinge portion 22.

The driven arm 30 is rotatably connected with the pivot shaft connecting portion 14 of the base arm 10 by the pivot shaft 18. In addition, a driven hinge portion 32 is formed at one end of the driven arm 30, and the driven arm 30 makes a hinge motion around the pivot shaft 18 as the driven hinge portion 32 is rotatably connected with the pivot shaft 18. In this regard, a bushing 5 may be interposed between the driven hinge portion 32 and the pivot shaft 18 in a portion of connecting the driven arm 30 with the pivot shaft 18. Further, a second pulley connecting portion 34 is formed at the other end of the driven arm 30 which extends from the driven hinge portion 32. Meanwhile, the driven arm 30 extends from the driven hinge portion 32 to the second pulley connecting portion 34 so as to surround an external circumference of the starting motor shaft pulley 100. In embodiments, the starting motor shaft pulley 100 is disposed so as to be surrounded by the base arm 10, the driving arm 20, and the driven arm 30. The portions of the arms facing the starting motor shaft pulley 100 are formed in an arc shape such that interference between them and the starting motor shaft pulley 100 is prevented even though spatial utility is improved.

The actuator 40 may be operated depending on all of a mechanical type and a hydraulic type, and one end of the actuator 40 is fixed to the actuator mounting portion 12 and the other end of actuator 40 is connected with the actuator connecting portion 24. In addition, the one end of the actuator 40 is bolted to the actuator mounting portion 12 by a bolt 3. Further, the other end of the actuator 40 may be bolted to the actuator connecting portion 24 by a bolt 3 or be rotatably connected with the actuator connecting portion 24. Herein, the function of the actuator 40 autonomously varying an entire length by the operations of a piston and a cylinder is well known to a person of an ordinary skill in the art, so a detailed description thereof will be omitted. A distance between the actuator mounting portion 12 of the base arm 10 and the actuator connecting portion 24 of the driving arm 20 is varied depending on an operation of the actuator 40, thereby making a hinge motion of the driving arm 20 around the pivot shaft 18.

The first pulley 51 is rotatably connected with the first pulley connecting portion 26 so as to be rolling while contacting the belt 60.

The second pulley 52 is rotatably connected with the second pulley connecting portion 34 so as to be rolling while contacting the belt 60. Meanwhile, the idler 300, the starting motor shaft pulley 100, and the crankshaft pulley 200 are rolling while contacting an interior surface of the belt 60, and the first pulley 51 and the second pulley 52 are rolling while contacting an exterior surface. In embodiments, the belt 60 is arranged to surround the idler 300, the starting motor shaft pulley 100, and the crankshaft pulley 200.

The tensioner 1 for a hybrid electric vehicle according to an embodiment of the present invention further includes a spring 7.

The spring 7 elastically connects the driven arm 30 with the pivot shaft 18. In addition, the driven arm 30 may make a hinge motion together with the driving arm 20 when the driving arm 20 rotates depending on an operation of the actuator 40 and relatively rotate to the driving arm 20 as being permitted by the spring 7. Further, the spring 7 provides elastic force such that the second pulley 52, which is contacted with the belt 60, maintains tension of the belt 60. In embodiments, the driven arm 30 does not integrally make a hinge motion together with the driving arm 20 when the driving arm 20 rotates depending on an operation of the actuator 40, and can be relatively rotated with the driving arm 20 as being permitted by the spring 7 according to a force that the second pulley 52 is supported by tension of the belt 60.

Meanwhile, to interpose a washer 71 and 73, a rubber ring 72 and 74, a dust cover 75, and so on for smoothly operating the tensioner 1 for a hybrid electric vehicle may be applied depending on a design by a person of an ordinary skill in the art.

Figure 3:
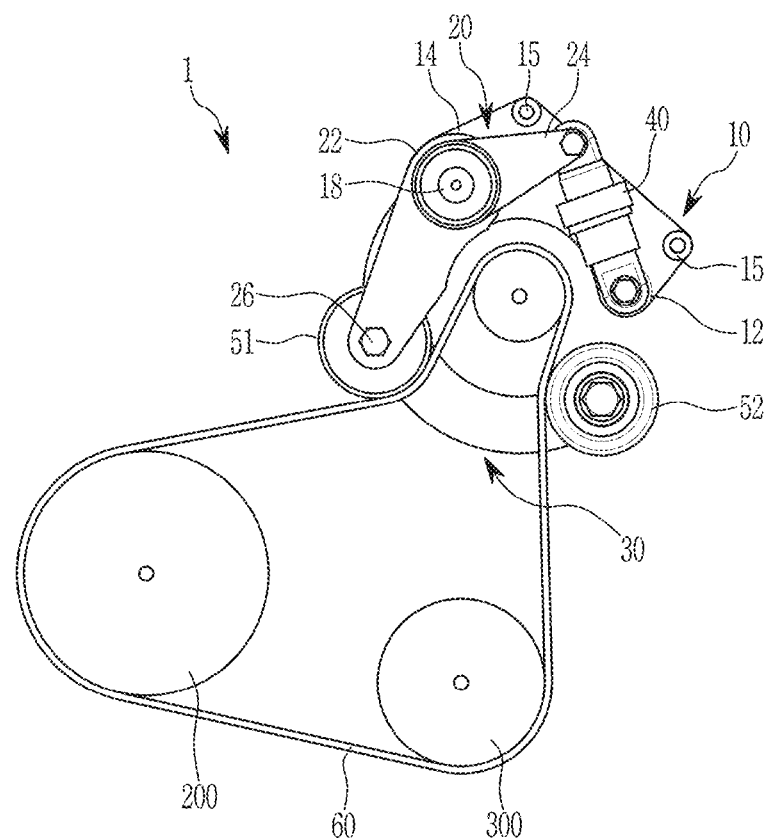
FIGS. 3 to 5 are operational views of a tensioner for a hybrid electric vehicle according to an embodiment of the present invention.
Figure 4:
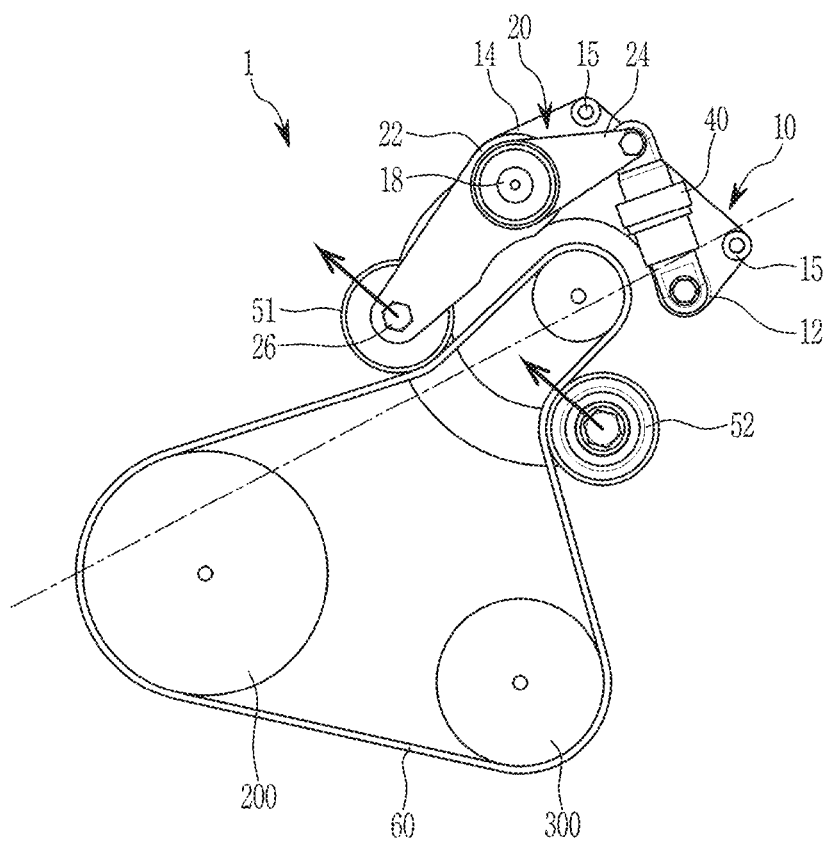
Figure 5:
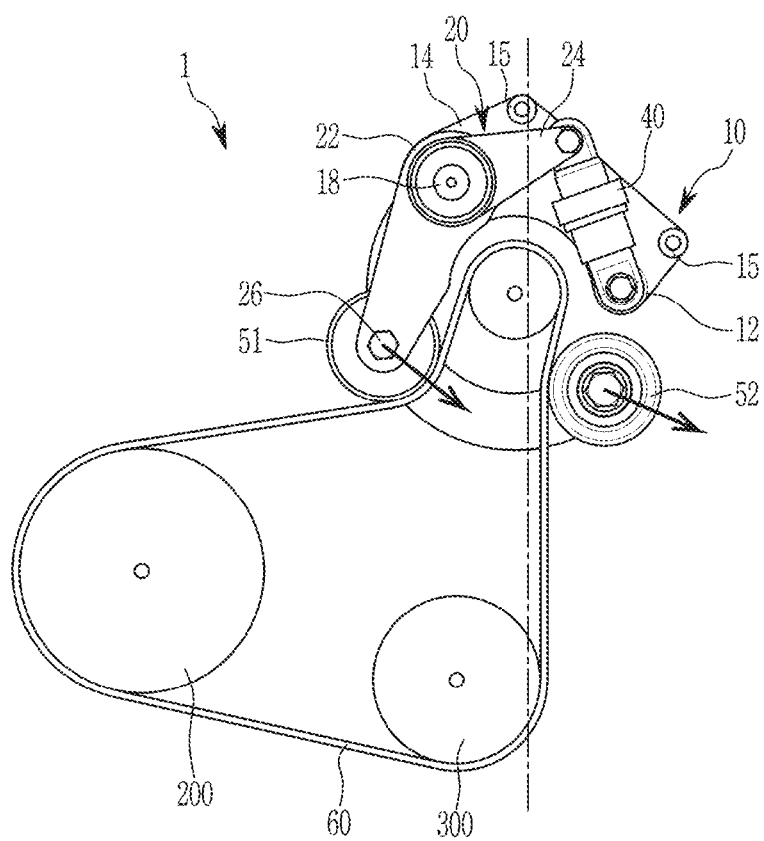

FIGS. 3 to 5 are operational views of a tensioner for a hybrid electric vehicle according to an embodiment of the present invention.

As shown in FIG. 3, the first pulley 51 and the second pulley 52 are disposed such that tension of the belt 60 is to be smallest when mounting the belt 60. In this time, the actuator 40 may be not operated.

As shown in FIG. 4, as the actuator 40 is operated to pull the actuator connecting portion 24 of the driving arm 20 when an engine is started by rotation of the starting motor shaft pulley 100 depending on the starting motor, a distance between the actuator mounting portion 12 and the actuator connecting portion 24 is to be short in comparison with a state of not operating the actuator 40, and the first pulley 51 and the second pulley 52 move toward one direction such that a portion of the belt 60 which is contacted to the first pulley 51 is to be similar to a straight line shape. In one embodiment, when an engine starts by rotation of the starting motor shaft pulley 100, a distance between the actuator mounting portion 12 and the actuator connecting portion 24 is to be shorter than that when the actuator 40 does not operate.

As shown in FIG. 5, as the actuator 40 is operated to push the actuator connecting portion 24 of the driving arm 20 when the starting motor generates electric power, a distance between the actuator mounting portion 12 and the actuator connecting portion 24 is to be long in comparison with a state of not operating the actuator 40, and the first pulley 51 and the second pulley 52 move toward the other direction such that a portion of the belt 60 which is contacted to the second pulley 52 is to be similar to a straight line shape. In one embodiment, when the starting motor generates electric power, a distance between the actuator mounting portion 12 and the actuator connecting portion 24 is to be longer than that when the actuator 40 does not operate.

According to an embodiment of the present invention, spatial utility may be improved and mounting performance may be better even though merits of a hydraulic type and a mechanical type are realized as a composition of applying all of a hydraulic type and a mechanical type is simple. In addition, cost may be reduced and weight may be decreased by a simple composition even though traditional performance is maintained or performance is improved as a hydraulic type is basically used. Further, the tensioner may have compatibility to a great part of hybrid electric vehicles as the tensioner can be applied to the mild hybrid electric vehicle having the mild hybrid starter & generator (MHSG) among hybrid electric vehicles.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A tensioner for a hybrid electric vehicle for adjusting tension of a belt which is provided to synchronize rotation of a starting motor shaft pulley and rotation of a crankshaft pulley, comprising:
    a base arm fixed to a housing of a starting motor, wherein the base arm comprises an actuator mounting portion is formed at one end thereof and a pivot shaft connecting portion at the other end thereof;
    a pivot shaft rotatably connected with the pivot shaft connecting portion;
    a driving arm rotatably connected with the base arm by the pivot shaft so as to make a hinge motion around the pivot shaft, wherein the driving arm comprises an actuator connecting portion is formed at one end thereof, a first pulley connecting portion is formed at the other end thereof and a pivot shaft connecting portion at an intermediate location of the driving arm;
    a driven arm comprising one end thereof that is rotatably connected with the base arm and the driving arm by the pivot shaft so as to make a hinge motion around the pivot shaft, wherein the driven arm further comprises a second pulley connecting portion formed at the other end thereof;
    an actuator configured to autonomously vary its length, wherein the actuator comprises one end thereof fixed to the actuator mounting portion and the other end thereof connected with the actuator connecting portion;
    a first pulley rotatably connected with the first pulley connecting portion and configured to roll while maintaining contact with the belt; and a second pulley rotatably connected with the second pulley connecting portion and configured to roll while maintaining contact with the belt, wherein a distance between the actuator mounting portion and the actuator connecting portion is varied depending on an operation of the actuator, thereby making a hinge motion of the driving arm around the pivot shaft, and the driven arm makes a hinge motion together with the driving arm.

2. The tensioner of claim 1, wherein a bushing is interposed between the driving arm and the pivot shaft.

3. The tensioner of claim 1, wherein a bushing is interposed between the driven arm and the pivot shaft.

4. The tensioner of claim 1, wherein the driven arm extends from the one end thereof to the other end thereof so as to extend around an external circumference of the starting motor shaft pulley.

5. The tensioner of claim 4, wherein the starting motor shaft pulley is disposed so as to be at least partially surrounded by the base arm, the driving arm, and the driven arm, and a part of the base arm and a part of the driven arm facing to the starting motor shaft pulley are formed in an arc shape.

6. The tensioner of claim 1, wherein the actuator is operated depending on all of a mechanical type and a hydraulic type.

7. The tensioner of claim 1, wherein the starting motor shaft pulley and the crankshaft pulley are configured to roll while maintaining contact with an interior surface of the belt and the first pulley and the second pulley are configured to roll while maintaining contact with an exterior surface of the belt, wherein the belt surrounds the starting motor shaft pulley and the crankshaft pulley.

8. The tensioner of claim 1, further comprising a spring configured to apply elastic force such that the second pulley maintains tension of the belt by elastically connecting the driven arm with the pivot shaft, wherein the driven arm is relatively rotated with the driving arm as being permitted by the spring.

9. The tensioner of claim 1, wherein the first pulley and the second pulley are disposed such that tension of the belt is to be smallest in a state of not operating the actuator when mounting the belt.

10. The tensioner of claim 9, wherein the actuator is configured to operate such that a distance between the actuator mounting portion and the actuator connecting portion when an engine is started by rotation of the starting motor shaft pulley is to be shorter than that when the actuator does not operate, which causes the first pulley and the second pulley to move toward one direction such that a portion of the belt contacting the first pulley is to be similar to a straight line shape.

11. The tensioner of claim 10, wherein the actuator is configured to operate such that a distance between the actuator mounting portion and the actuator connecting portion when electric power is generated by the starting motor shaft pulley is to be longer than when the actuator does not operate, which causes the first pulley and the second pulley to move toward the other direction such that a portion of the belt contacting the second pulley is to be similar to a straight line shape.

* * * * *